United States Patent [19]

Komamura

[11] Patent Number: 5,192,960
[45] Date of Patent: Mar. 9, 1993

[54] GLASSES FOR STEREOSCOPIC VIEWING

[75] Inventor: Toshio Komamura, Tokyo, Japan

[73] Assignee: Yugen Kaisha Somasha, Tokyo, Japan

[21] Appl. No.: 672,434

[22] Filed: Mar. 20, 1991

[30] Foreign Application Priority Data

Mar. 22, 1990 [JP] Japan .................. 2-29229[U]

[51] Int. Cl.⁵ .................................. G02C 13/00
[52] U.S. Cl. ................................. 351/41; 351/158; 359/462; 359/678
[58] Field of Search ............... 351/201, 158, 41, 202; 359/462, 466, 474, 408, 678

[56] References Cited

U.S. PATENT DOCUMENTS 4,925,270 5/1990 Eckmann .................. 351/201

Primary Examiner—Bruce Y. Arnold
Assistant Examiner—Hung Xuan Dang
Attorney, Agent, or Firm—Finnegan, Henderson, Farabow, Garrett & Dunner

[57] ABSTRACT

A stereoscopic glasses of a construction, in which left and right lenses are formed into a single integral body, which is fitted into a lens frame and maintained in it.

3 Claims, 2 Drawing Sheets

ABSTRACT

GLASSES FOR STEREOSCOPIC VIEWING

BACKGROUND OF THE INVENTION a) Field of the Invention

This invention relates to glasses for stereoscopic viewing, and, more particularly, it is concerned with stereoscopic glasses to be used for observing two-dimensional images such as a pair of photographic pictures, having a parallax, by synthesizing them into a stereoscopic or three-dimensional image.

b) Description of Prior Art

Stereoscopic glasses are to observe a two-dimensional image such as a pair of photographic pictures which are arranged side by side and having a parallax corresponding to a distance between left and right eyes, as a stereoscopic (or three-dimensional) image. The pictures are respectively observed with the left and right eyes through the lenses and blended or synthezied by the latent capability of stereoscopic viewing possessed by the observer. For such stereoscopic glasses, there have heretofore been proposed various constructions.

However, these prior art devices have had various problems. In particular left and right glass lenses have been formed as separate units and individual by mounted on a lens frame. As a result discrepancy could occur in the lens axis, and manufacture and assembly of such stereoscopic glasses have been troublesome and expensive, and others.

SUMMARY OF THE INVENTION

The present invention has been made in the light of the abovementioned problems inherent in the conventional stereoscopic glasses, and aims at providing stereoscopic glasses that are free from undesirable discrepancy in the axis of the left and right lenses, and are capable of being manufactured easily and at low cost.

With a view to attaining the above mentioned object, the stereoscopic glasses according to the present invention are so constructed that both left and right lenses are formed into an integral body, which is incorporated as a whole and held in a lens frame.

The foregoing object, other objects as well as the specific construction and function of the stereoscopic glasses according to the present invention will become more apparent and understandable from the following detailed description thereof, when read in conjunction with the accompanying drawings.

BRIEF DESCRIPTION OF THE ACCOMPANYING DRAWINGS

DETAILED DESCRIPTION OF PREFERRED EMBODIMENTS

The stereoscopic glasses according to the present invention are constructed by forming the left and right lenses in a single integral body, and such integrally constructed lens body is fitted and maintained in a lens frame. In this way, the problem of discrepancy in the axes of the individual left and right lenses can be solved, and the stereoscopic glasses can be manufactured easily and at a reduced cost.

With a view to enabling those persons skilled in the art to put the present invention into practice, the following preferred embodiments are presented. It should, however, be noted that these embodiments are illustrative only and that various changes and modifications may be made without departing from the spirit and scope of the present invention.

Figure 1:
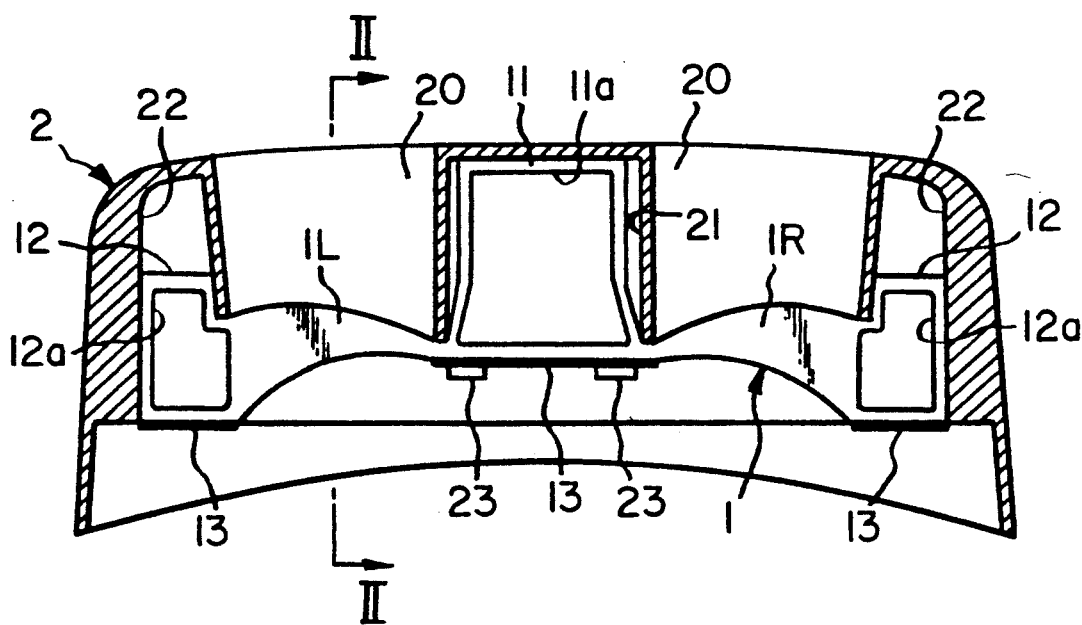
FIG. 1 is a plan view, partly in cross-section, showing one embodiment of the stereoscopic glasses according to the present invention.
Figure 2:
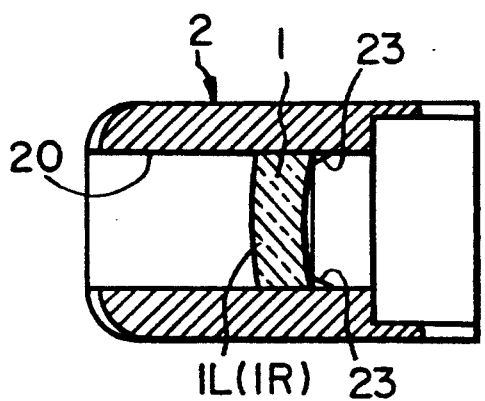
FIG. 2 is a side view, in longitudinal cross-section, of the stereoscopic glasses, taken along the line II—II in FIG. 1.

Reference is first made to FIGS. 1 and 2, which are respectively a plan view partly in cross-section and a side elevational view in longitudinal cross-section, showing one embodiment of the stereoscopic glasses according to the present invention.

In the drawing, a reference numeral 1 designates a lens body, in which the left and right lenses (prisms) 1L and 1R are integrally formed of a transparent synthetic resin such as polymethyl methacrylate (PMMA) resin, etc. The front and rear surfaces of each lens are shaped in convex and concave forms, respectively. Between and at both left and rights sides of both lenses 1L and 1R, there are integrally formed protrusions 11 and 12 for positioning the lens body 1 relative to a frame 2, as will be mentioned hereinbelow. Each of these protrusions 11 and 12 has a hollow 11a or 12a inside it.

The frame 2 is formed in a flat and substantially cylindrical shape with non-transparent synthetic resin in dark color such as black. In the interior of the frame 2, there are formed respective openings 20 through the frame front side for transmission of light through the lenses 1L and 1R. A lens body fitting cavity 21 is located between the frame openings 20 and other lens body fitting cavities 22 are respectively located to the sides of the frame openings 20 toward the outer frame ends. The positioning protrusions 11, 12 of the lens body 1 are engaged in the frame openings 20, 22 after being inserted from a rear open side of the frame 2 as shown in FIG. 1. Thus, the lens body 1 is properly set in its predetermined position in the lens frame. Reference numeral 23 refers to frame protrusions that hold the lens body 1 in place once it is inserted.

It may be advantageous to form the frame openings 20, 20 with a relatively long length in the front-rear direction with a predetermined space interval between them in the left-right direction, as shown in the drawings, whereby, when the left and right images are separately through the left and right lenses 1L and 1R, the neighboring image will not come into the sight of the other.

Further, when it is expected that the incident light into the left and right lenses 1L and 1R may leak to the rear surface side of the lens body protrusions 11 and 12, a non-transparent treatment 13 such as black paint, may be applied thereto, a light-intercepting member (not shown) may be disposed on the rear surface of the lens body protrusions 11, 12.

Figure 3:
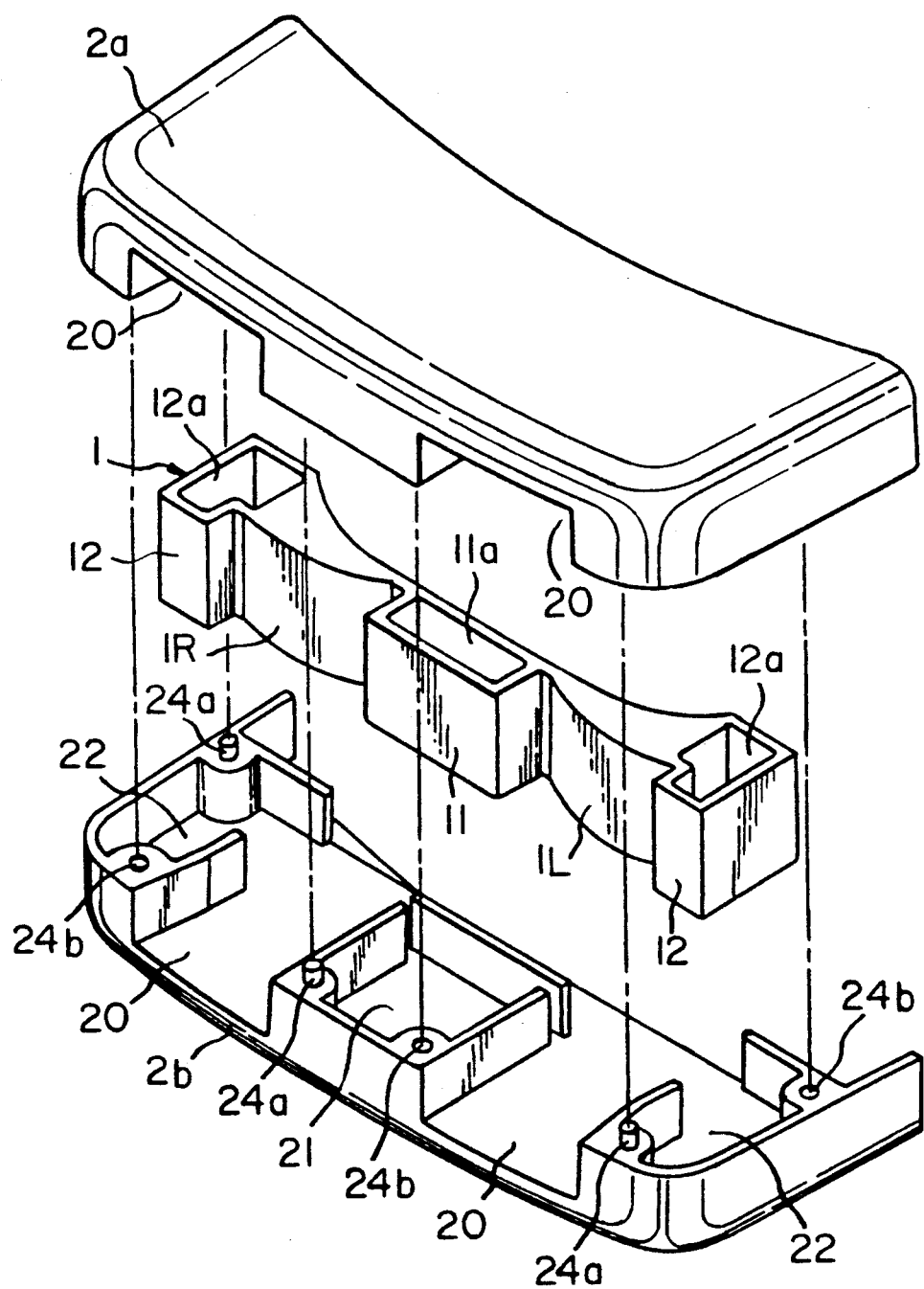
FIG. 3 is an exploded perspective view showing another embodiment of the stereoscopic glasses according to the present invention.

FIG. 3 illustrates another embodiment of the stereoscopic glasses constructed in accordance with the present invention. In this embodiment the frame 2 is halved into upper and lower portions 2a and 2b, and the lens body 1 is held between these two portions in a sandwich form.

The lens body 1 is formed in a manner similar to the first-described embodiment, and the frame cavities 21, 22 for receiving the positioning protrusions 11, 12 provided on the lens body 1 are formed in each of the abovementioned halved portions 2a, 2b of the lens frame 2 at their respectively corresponding positions. The lens body 1 accordingly is inserted into either halved portion 2a or 2b of the lens frame 2 from the meeting surface of the lens frame portion 2a or 2b with the lens body protrusions 11, 12 fitted into the cavities 21, 22. The other halved frame portion 2b or 2a is then put in place to provide a complete assembly with the lens body 1 properly positioned within.

Further, the meeting surfaces of the abovementioned halved portions 2a and 2b of the lens frame 2 have a fixing means, preferably a plurality of sets of pins 24a and holes 24b provided on and in them so as to be press-fitted relative to each other. By the mutual press-fitting of the pins and holes, the halved portions 2a and 2b of the lens frame 2 are joined and held together, between which the lens body 1 is received and held. Moreover, the pins 24a and holes 24b are so made that, by symmetrically positioning them to the left-and-right direction, both halved portions 2a and 2b of the frame 2 have become identical shapes thereby reducing manufacturing costs.

Figure 4:
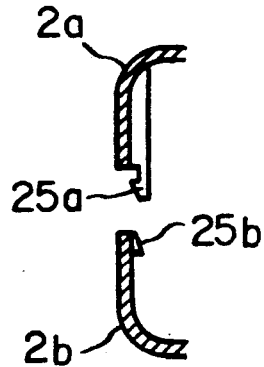
FIG. 4 is a cross-sectional view showing the interconnection of the upper and lower halves of the lens frame for the stereoscopic lens according to a modified embodiment of the present invention.

The fixing means for the halved frame portions 2a and 2b is not limited to such pins 24a and holes 24b but it may, for example, be constructed in the form of, mutually engaging pawls 25a, 25b, etc. as shown in FIG. 4, or it may be realized by threaded screws, or by glue. Combination of these and other various fixing means are also feasible. In all these cases of fitting the halved portions 2a and 2b of the lens frame 2 together, it is advantageous that both halved portions be made identical in shape, whereby a single shaping mold can be used to make such halved portions with use of a synthetic resin.

In the invention embodiment just described, the lens frame 2 is formed with the upper and lower halves, but it is also feasible to form it with front and rear halves with the lens body held between them.

As has been explained in the foregoing, since the stereoscopic glasses according to the present invention is so constructed that the left and right lenses 1L and 1R are formed into a single lens body, which is then held in the lens frame 2. In conventional stereoscopic glasses where the left and right lenses are formed as separate bodies and respectively held in the lens frame, discrepancy has existed in the axial lines of the left and right lenses. Such discrepancy is eliminated by the present invention. Furthermore, since the left and right lenses 1L and 1R can be formed in a single integral body of a transparent synthetic resin, etc., the number of the assembly parts can be reduced, which contributes to simple and easy assembly of the product with reduced mass-production costs and other benefits.

What is claimed is:

1. Stereoscopic glasses comprising:
    an elongated integral lens body having a left lens and a right lens;
    said left lens and said right lens each having a front convex surface and a rear concave surface;
    an elongated lens frame longer than said lens body and having a rear side generally open to the exterior and a front side having portions open to the exterior for said left lens and said right lens; and
    said lens body disposed in said lens frame with said left lens and said right lens facing the exterior through the front side portions of said lens frame.

2. Stereoscopic glasses comprising:
    an integral lens body having a left lens and a right lens;
    said left lens and said right lens each having a front convex surface and a rear concave surface; and
    a lens frame having upper and lower halved portions between which said lens body is positioned and held.

3. The stereoscopic glasses defined in claim 2 wherein said upper and lower halved portions of said lens frame are substantially the same shape.

* * * * *